United States Patent
Hess et al.

(10) Patent No.: US 7,386,133 B2
(45) Date of Patent: Jun. 10, 2008

(54) SYSTEM FOR DETERMINING THE POSITION OF A SOUND SOURCE

(75) Inventors: Wolfgang Georg Hess, Witten (DE); Hans-Jurgen Nitzpon, Waldbronn (DE); Michael Zeller, Karlsbad-Spielberg (DE)

(73) Assignee: Harman International Industries, Incorporated, Northridge, CA (US)

( * ) Notice: Subject to any disclaimer, the term of this patent is extended or adjusted under 35 U.S.C. 154(b) by 0 days.

(21) Appl. No.: 10/962,233

(22) Filed: Oct. 9, 2004

(65) Prior Publication Data

US 2005/0078833 A1    Apr. 14, 2005

(30) Foreign Application Priority Data

Oct. 10, 2003    (EP)    ................... 03022983

(51) Int. Cl.
*H04R 5/00*    (2006.01)
*H04R 5/02*    (2006.01)

(52) U.S. Cl. ............... 381/26; 381/309; 381/17

(58) Field of Classification Search ........ 381/310, 381/56

See application file for complete search history.

(56) References Cited

U.S. PATENT DOCUMENTS 5,046,097 A * 9/1991 Lowe et al. ............ 381/17
5,381,512 A   1/1995 Holton et al.
5,742,689 A * 4/1998 Tucker et al. ........... 381/17
7,167,567 B1 * 1/2007 Sibbald et al. .......... 381/17
2004/0136538 A1 * 7/2004 Cohen et al. ........... 381/17

OTHER PUBLICATIONS

Chiang-Jung et al, "A neuromorphic microphone for sound localization" Systems, Man, and Cybernetics, 1997. Computational Cybernetics and Simulation, 1997 IEEE International Conference on Orlando, FL, USA Oct. 12-15, 1997, New York, NY, USA, IEEE, US, Oct. 12, 1997, pp. 1469-1474, XP010249534, ISBN: 0-7803-4053-1.

Nakadai K. et al, "Auditory Fovea based speech separation and its application to dialog system" Proceedings of the 2002 IEEE/RSJ International Conference on Intelligent Robots and Systems. (IROS 2002). Lausanne, Switzerland, Sep. 30-Oct. 4, 2002, IEEE/RSJ International Conference on Intelligent Robots and Systems, New York, NY: IEEE, US, vol. 1 of 3, Sep. 30, 2002, pp. 1320-1325, XP010609601, ISBN: 0-7803-7398-7.

Georgiou P. G. et al, "A multiple input single output model for rendering virtual sound sources in real time" Multimedia and Expo, 2000. ICME 2000. 2000 IEEE International Conference on New York, NY, USA Jul. 30-Aug. 2, 2000, Piscataway, NJ, USA, IEEE, US, Jul. 30, 2000, pp. 253-256, WP010511447, ISBN: 0-7803-6536-4.

(Continued)

*Primary Examiner*—Xu Mei
(74) *Attorney, Agent, or Firm*—The Eclipse Group LLP

(57) ABSTRACT

A method and system for determining the position of a sound source in relation to a reference position, comprising the steps of generating a sound signal emitted from the sound source, detecting the emitted sound signal, processing the sound signal by the use of a physiological model of the ear, deducing at least one of lateral deviation in relation to the reference position, time delay of the sound signal from the sound source to the reference position, and the sound level of the detected sound signal.

22 Claims, 6 Drawing Sheets

OTHER PUBLICATIONS

Chang P-R et al, "Fuzzy neural systems for controlling sound localization in stereophonic reproduction" IEE Proceedings D. Control Theory & Applications, Institution of Eletrical Engineers. Stevenage, GB, vol. 145, No. 4, Jul. 28, 1998, pp. 393-401, XP006010993, ISSN: 1350-2379.

* cited by examiner

SYSTEM FOR DETERMINING THE POSITION OF A SOUND SOURCE

RELATED APPLICATIONS

This application claims priority to European Patent Application Serial No. 03022983.5 filed on Oct. 10, 2003, which is incorporated into this application by reference in its entirety.

BACKGROUND OF THE INVENTION

1. Field of the Invention

The invention relates to a system and a method for determining the position of a sound source in relation to a reference position. The invention relates especially to a method for determining the individual positions of a plurality of sound sources of a multi channel audio system.

2. Related Art

Recently, multi channel audio and video systems have become more and more popular, especially for home entertainment application. In these systems, the sound is stored on a storage medium such as a DVD or a SACD (super audio CD) and the sound is encoded in bit streams for each channel of the multi channel audio system. Normally, home entertainment audio or video systems comprise five loudspeakers and one subwoofer. To optimize the sound produced from this loudspeaker system, the loudspeakers should have a special geometrical arrangement relative to each other. In the case of a 5.1 surround setup comprising five loudspeakers there exist standards (e.g. ITU-R BS 775-1 for 5.1 systems). In these standards, the position of the loudspeakers relative to an optimal listening position, generally known as a "sweet-spot" is defined. By way of example, in a 5.1 surround setup the five loudspeakers should have the following position in an horizontal plane: One loudspeaker in the center at 0° azimuth in the horizontal plane, one front left loudspeaker at 30°, one front right loudspeaker at −30°, one left surround loudspeaker at 110° and one right surround loudspeaker at −110°. This speaker setup will be explained in detail below. If these loudspeaker positions can be obtained, the surround sound may be optimized for the manner in which the sound was recorded and the manner in which the different channels of the multi channel audio system were encoded.

Especially in home cinema applications, but also in professional applications within a professional sound studio, it is not always possible to place the different loudspeakers at their ideal position. Furthermore, all loudspeakers should have the same distance relative to the listening position. This condition can also be difficult to fulfill, especially in the case where the loudspeakers have to be placed in a living room of an individual user of the system.

Available systems nowadays often comprise possibilities for adjusting the system to the room in which it is arranged. Therefore, the user of the system has to measure manually the distance of the different loudspeakers to the sweet-spot, determine the sound level of each loudspeaker at the sweet-spot and determine the lateral position of deviation of the different loudspeakers. Determining the angle of the loudspeaker relative to the center axis may be especially difficult.

Therefore, a need exists to automatically determine the position of a sound source such as a loudspeaker relative to a reference position.

SUMMARY OF THE INVENTION

In one example implementation of the invention, the method for determining the position of a sound source in relation to a reference position comprises generating a sound signal emitting from a sound source. This sound signal as emitted from the sound source is detected and the sound signal is processed by the use of a physiological model of the ear. From that, at least one of lateral deviation in relation to the reference position, time delay of the sound signal from the sound source to the reference position and the sound level of the detected sound signal can be deduced. The method for determining the position, time delay or sound level may be based on a simulation of the human auditory signal processing. Using this simulation of the human auditory signal processing it is possible to automatically determine the parameters needed to obtain the position of a sound source such as a loudspeaker. This is especially helpful for the determination of the correct position of the loudspeakers in a multi channel audio system. With this method the position, i.e., the lateral deviation in relation to the reference position, the time delay and the sound level can be determined for each sound source separately. With the obtained results, the different loudspeakers can be adapted to their ideal position as proposed by different standards.

The sound signal may be detected by a sound receiving unit having two microphones arranged spatially apart resulting in two audio channels that are processed by the physiological model. The two microphones may be positioned in the right and left ear of a dummy with replication of the external ear. The auditory system may be described as a system with two input channels. To simulate binaural auditory events, several models exist that are usually divided into two groups of algorithms. One group is formed from physiologically driven models and the other one from psycho-acoustically driven approaches. For the purpose of evaluating acoustical properties of rooms, it is not meaningful to simulate every part of the human auditory system. It is sufficient to simulate an auditory pathway just accurately enough to be able to predict a number of psycho-acoustical phenomena that are of interest. Since localization of the position of an auditory event seems to be fairly stable even in reverberant environments, audio set up configurations may be evaluated by a computational binaural model of auditory localization that is fed with the binaural room-impulse responses captured by a measurement method that is as close as possible to the way the human auditory system receives acoustic input. Therefore, the sound signal emitted from the sound source is an impulse and the head-related, binaural impulse responses may be detected.

The sound signal is processed by using a physiological model of the ear. This means that the path of the sound from the outer ear to the inner part of the head has to be simulated. Due to the fact that the two microphones of the sound receiving unit are positioned in the right or left ear of a dummy with replication of the external ear, the filtering by the outer ears is already encoded in the measured head related impulse responses, i.e., the ear input signals. It should be understood that the microphones need not to be positioned in the ear of the dummy head. If no dummy head is used, however, the signal path from the outer ear to the inner ear has to be considered when simulating the path of the sound signal. The use of a dummy head with a detailed replication of the human outer ear may help to improve the results obtained by the simulation.

In one embodiment, the sound signal of the left and the right ear may be processed by applying a gammatone-filter bank to the recorded signal. This signal processing step simulates the inner ear. By the gammatone-filter bank the frequency deposition as performed by the cochlea is simulated.

According to a further aspect of the invention, the sound signal may be processed by a half-wave rectification of the recorded sound signal. This half-wave rectification of the sound signal is performed in order to mimic the firing behavior of the inner hair cell response. According to a further aspect of the invention, the sound signal may be processed by low-pass filtering the recorded sound signal to consider that the fine structure of the rectified signals cannot be resolved in the higher frequency bands and the signals are low-pass filtered after the half-wave rectification.

According to a further aspect of the invention, the two channel audio signal may be processed by carrying out a cross-correlation analysis of the sound signals of the left and the right ear, said cross-correlation analysis resulting in the interaural time differences (ITD) of the left and right ear. The interaural time difference (ITD) describes the time delay of a sound event that is received at two different points of time in the right and left ear depending on the distance the sound has to travel to the two ears.

According to a further aspect of the invention, the signal may be processed by introducing inhibition elements resulting in the interaural level differences (ILD) of the left and the right ear. The ILD describes the differences of sound levels of a sound that is received in the left and right ear. Depending on the position of the head relative to the sound source the sound level will differ on the right and the left ear, resulting in an interaural level difference (ILD).

According to a further aspect of the invention, the signal processing may comprise the steps of deducing a binaural activity pattern (BAP) from the interaural time differences (ITD) and the interaural level differences (ILD), the binaural activity pattern comprising the intensity of the sound signal in dependence of time and comprising the intensity of the sound signal in dependence of the lateral deviation of the sound source. A transformation from an ITD-scale to a scale representing the position on the left-right deviation scale helps to determine the relative position of the sound source. The binaural activity pattern comprising the intensity of the sound signal in dependence of time and in dependence of the lateral deviation of the sound source allows the determination of the time delay, the determination of the intensity of the sound signal and the determination of the sound level. This is possible as the time delay can be deduced from the intensity of the sound signal in dependence of time, the lateral deviation can be deduced from the intensity of the sound signal in dependence of the lateral position of the sound signal relative to the reference position, and the sound level can be deduced from the maximum of the sound signal. As mentioned above, these three parameters (lateral position, sound level, and delay time) are used to determine the relative arrangement of the sound sources. According to the invention, the method provides as an output these three parameters so that the calculated positions and the sound levels can be used to correct the positions in accordance with a predetermined standard configuration, such as the ITU-R BS.775-1 standard.

Instead of manually correcting the position of the sound sources to the position proposed by the standard after having calculated the actual position by the above described method, it is also possible to provide the above calculated values to a processing unit or a manipulation unit of the audio system or to the processing unit of an external computer, so that the different channels comprising the sound of each sound source can be corrected in such a way that the emitted sounds corresponds to the sound that would have been produced by a loudspeaker system, if the loudspeakers were positioned as proposed by the standard. Therefore, the lateral deviation, the time delay and the sound level can be used to calculate correction data that adjust the sound signal emitted from the sound sources according to an arrangement of sound sources that correspond to a predetermined standard arrangement of the sound sources. This predetermined standard arrangement of the sound sources may correspond to the arrangement of the sound sources according to an international standard, be it the above-mentioned ITU standard or any other standard. After having determined the parameters (lateral deviation, time delay and the sound level), the different channels of the sound sources can be controlled in such a way that an optimal sound is produced at the sweet-spot even, if the sound sources are not positioned at an ideal position suggested by the standards. The above-described methods for determining the position of a sound source is therefore especially dedicated for determining the individual positions of a plurality of sound sources of a multi channel audio system.

The invention further includes a system for determining the position of a sound source. The system may comprise a sound generator for generating sound. The generated sound can be a sound signal in the form of an impulse that is emitted from a sound source of the system for emitting the generated sound. The system further comprises a sound receiving unit for detecting the sound emitted from the sound sources and sound analyzer for processing the detected sound signal by the use of a physiological model of the ear and for deducing at least one of lateral deviation in relation to a reference position, time delay of the sound signal from the sound source to the reference position, and the sound level of the detected sound signal. The sound analyzer processes the detected sound signal in such a way, using the physiological model of the ear, that the lateral deviation in relation to a reference position, or the lateral position relative to a predetermined axis, the time delay and/or the sound level can be determined. From these parameters, the position of the sound source (the loudspeaker) relative to a listing position can be determined.

The sound receiving unit may comprise two microphones that are arranged spatially apart. These two microphones simulate the receiving of the sound in the human ear so that the system further comprises a dummy with two ears in which the microphones are positioned, the ears comprising general replications of the external ear. To simulate the auditory pathway as accurately as possible, the ears comprise replications of the external ear so that the sound detected at the inside corresponds to the sound detected by the inner human ear.

The detected sound may then be analyzed by a sound analyzer. The sound analyzer may comprises a gammatone-filter bank, a half wave rectification unit, a low pass filter, and a cross-correlation analysis unit. The gammatone-filter bank, the half-wave rectification unit and low pass filter, through which the detected signal of the right and the left ear paths, simulate the inner ear of human beings. In this manner, filtering devices for filtering the outer ears are not necessary as the filtering by the outer ears is already encoded in the measured head-related impulse responses, i.e., the ear input signals. After the signals have passed the gammatone-filter bank, the half-wave rectification unit and the low pass filter, the signals pass a cross-correlation analysis unit in which the signals are transformed to ITD signals. Furthermore, the sound analyzing means may comprise an inhibition unit comprising the inhibition function for determining the ILDs. From the ILDs and the ITDs the binaural activity pattern can be calculated. This binaural activity pattern of the head-related impulse responses can be used for the determination of position deviation, time delay and sound level, so that in case of several sound sources the system can determine the exact position of each sound source relative to a reference position and relative to the other sound sources.

The system may further comprise a manipulation unit for manipulating the sound emitted by the sound source for compensating a mismatch of actual position of the different sound sources relative to the reference position of each sound source. This manipulation unit can be used to adjust a non-optimal geometrical arrangement of the sound sources (loudspeakers) by an algorithm that uses the detected delay time, sound level and position deviation. Using these three parameters, the manipulation unit can manipulate the different channels of a multi channel audio system in such a way that an ideal sound can be obtained even though the loudspeakers are not positioned as proposed by the standard.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
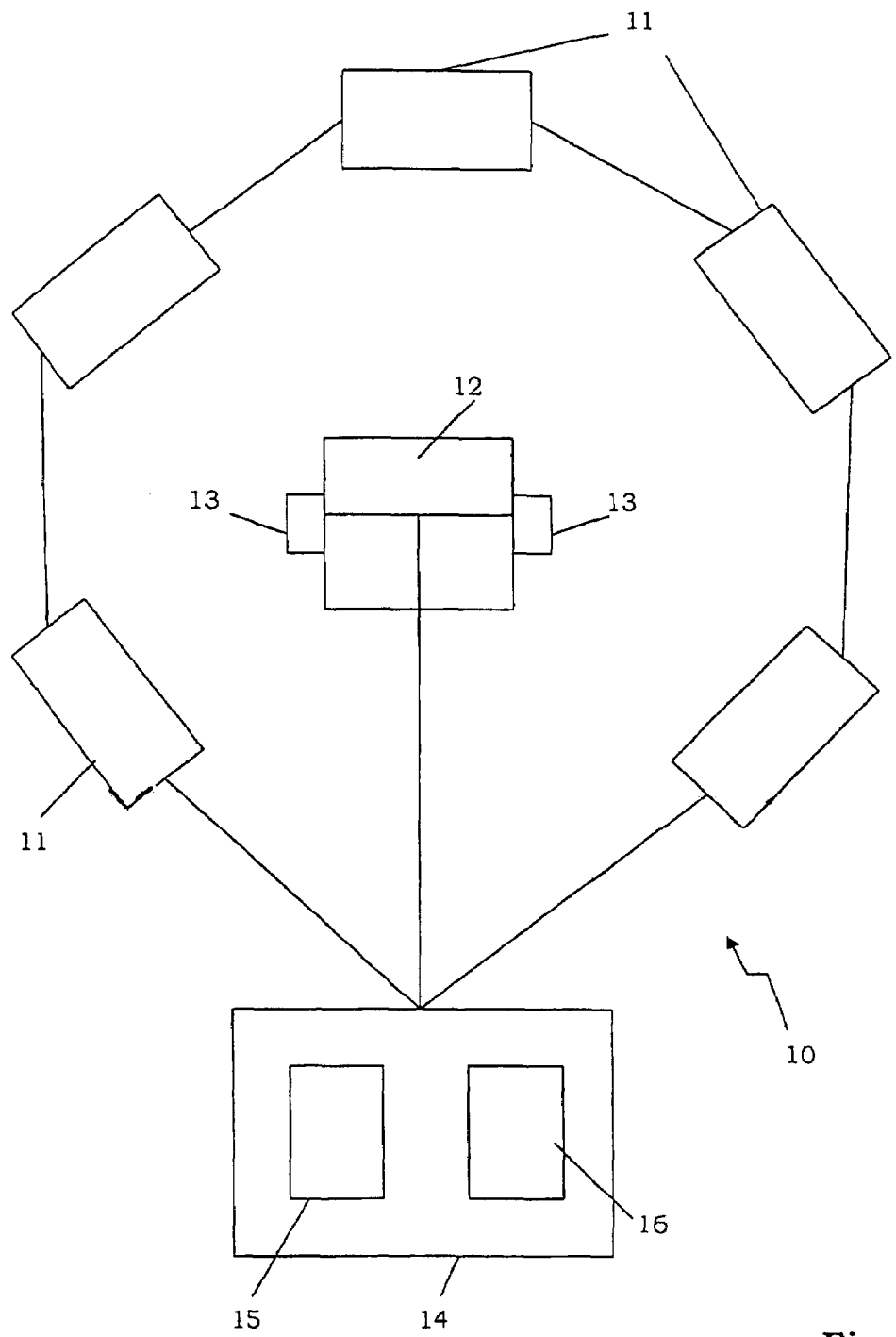
FIG. 1 is a schematic view of a system for determining the position of a sound source.

FIG. 1 shows a system 10 for determining automatically the position of sound sources 11. In the embodiment shown, five sound sources or loudspeakers 11 are shown. These five loudspeakers could be part of a multi channel audio or multi channel video system of a home entertainment system. They could also be part of a professional audio system in a sound studio or part of any other system incorporating sound sources. For detecting the sound emitted from the different sound sources 11, a dummy head 12 with a replication of the human ear may be arranged in the position the user of the sound system wants to use as listening position. The signals emitted from the sound sources 11 are picked up by the dummy head (e.g., a Neumann KU-80 with detailed replications of the external ear). The ears carry microphones 13 in the ear channels (e.g., Sennheiser KE4 microphones or other type of microphone known it the art to be suitable for this application). The sound detected from the microphones 13 may then be transmitted to a computer unit 14. This computer unit 14 can be a normal personal computer and comprises a sound analyzing unit 15 (i.e. a sound analyzer) in the sound manipulation unit 16. It should be understood that the computer unit 14 may further comprise a soundcard (not shown) for generating the sound emitted from the loudspeakers 11. Furthermore, the computer unit 14 may comprise a display unit for displaying the calculated processed audio signals. The five loudspeakers 11 may be installed in a living room (not shown) of an individual, in this kind of room the position of the different loudspeakers 11 relative to the listening position being different. To obtain an optimal surround sound for a surround sound setup the loudspeakers 11 have to be positioned at exact predetermined positions, and the distance of each loudspeaker from the listening position should be the same for each loudspeaker.

Figure 2:
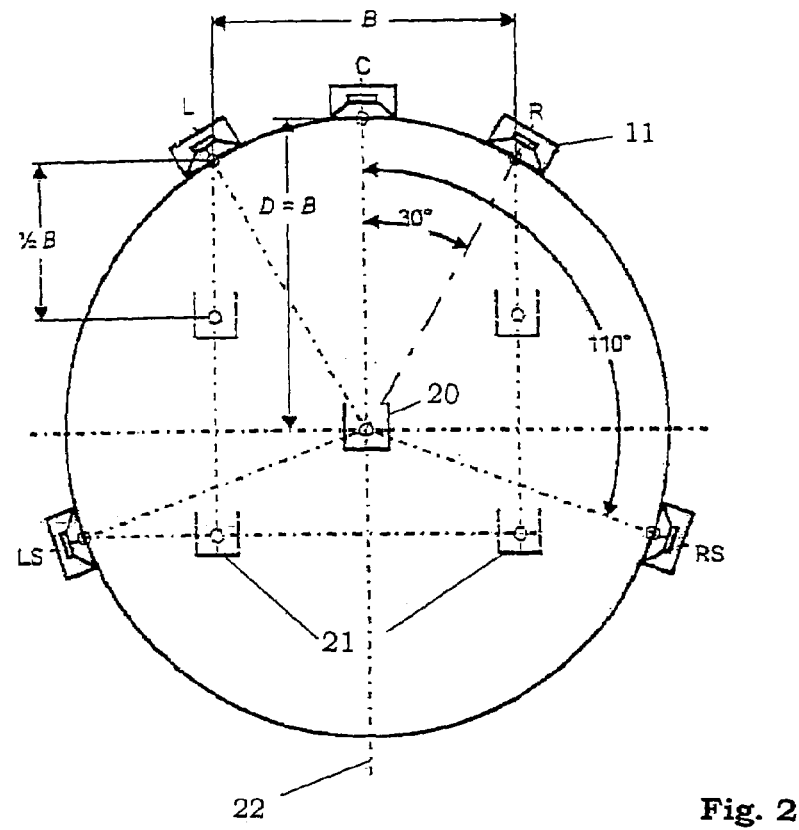
FIG. 2 shows the arrangement of a multi channel audio system according to the ITU-RBS.775-1 standard.

FIG. 2 shows an arrangement of loudspeakers as described in the ITU-R BS.775-1 standard. In this arrangement, all loudspeakers 11 should have the same distance D relative to a reference listening position 20 in the middle of the loudspeakers. This reference listening position 20 is also called "sweet-spot." Furthermore, the worst case listening positions 21 are shown. These worst case listening positions are arranged at half of the loudspeaker base width B. In this ideal arrangement, one center loudspeaker C is arranged in the middle of an axis 22 defined by the middle of the loudspeaker C and the reference listening position 20. One loudspeaker R is arranged on the front right side by 30°, another loudspeaker L is arranged at −30°, the right surround loudspeaker is arranged at 110° and the left surround loudspeaker is arranged at −110°, all loudspeakers having the same distance D=B to the reference listening position. With this arrangement of the loudspeakers an optimal surround sound can be obtained, as the sound emitted from the sound sources was produced for exact this loudspeaker arrangement. As can be seen from FIG. 2 it can be very difficult to keep these predetermined positions of the loudspeakers in a room. First, it can be possible that the arrangement of the different loudspeakers differs from the arrangement in FIG. 1 in such a way, that the loudspeakers are arranged at a different distance, and/or the loudspeakers cannot be positioned at the exact angles. The manual determination of the exact position of the loudspeakers can be very difficult, especially the determination of the different angles. If the condition shown in FIG. 2 is not met, the surround sound emitted from the five loudspeakers may not be optimized. All loudspeakers 11 shown in FIG. 2 should not differ more than 7° in elevation and all loudspeakers should have the same sound level. For each loudspeaker, three parameters are important, i.e., the azimuth angle of every loudspeaker relative to the sweet-spot, the sound level of each loudspeaker and the delay time, if the loudspeakers cannot be arranged at the same distance to the sweet-spot.

Figure 3:
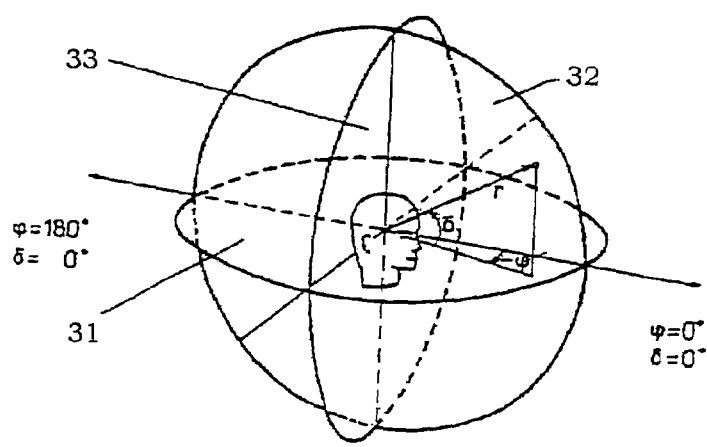
FIG. 3 shows a head-related coordinate system.

For the determination of these three parameters, a model of the human auditory system may be used. In FIG. 3, the coordinate system used in this simulation is shown. The head or the dummy head is arranged in the middle of the system with the front direction in the direction of $\phi=0°$, $\delta=0°$. In the figure shown in FIG. 3, $\phi$ represents the azimuth angle in the system and $\delta$ represents the elevation angle. Furthermore, the horizontal plane 31, the median plane 32 and the front plane 33 are shown. Using the coordinate system shown in FIG. 3 and the dummy head, the binaural room impulse responses were measured. Further details for the coordinate system shown in FIG. 3 can be found in Blauert, J.: Spatial Hearing—the psychophysics of human sound localization ($2^{nd}$ enhanced edition), MIT Press, Cambridge, Mass., 1997, which is incorporated into this application by reference.

Figure 4:
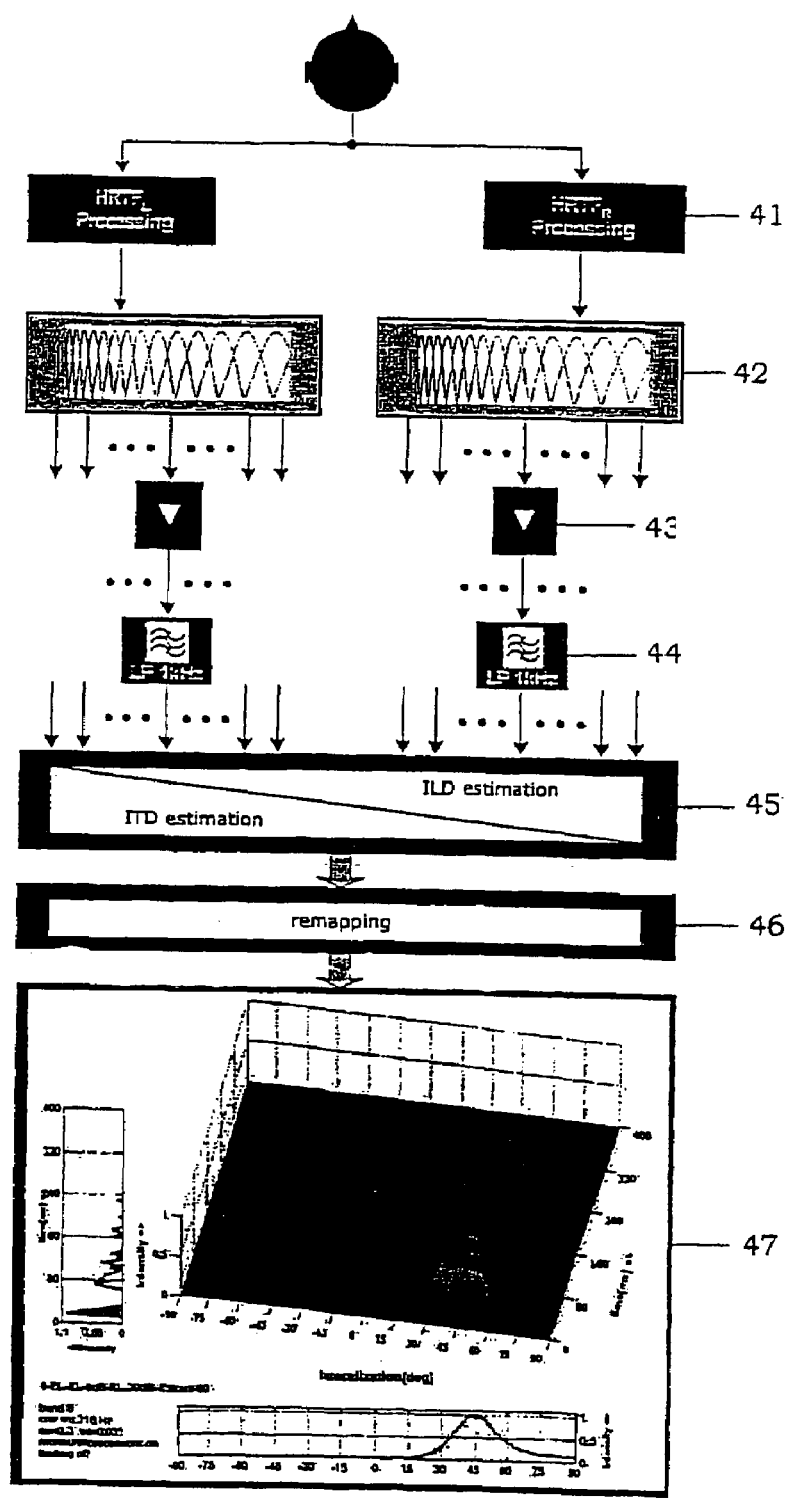
FIG. 4 shows a binaural model for calculating the position of the sound source.
Figure 5:
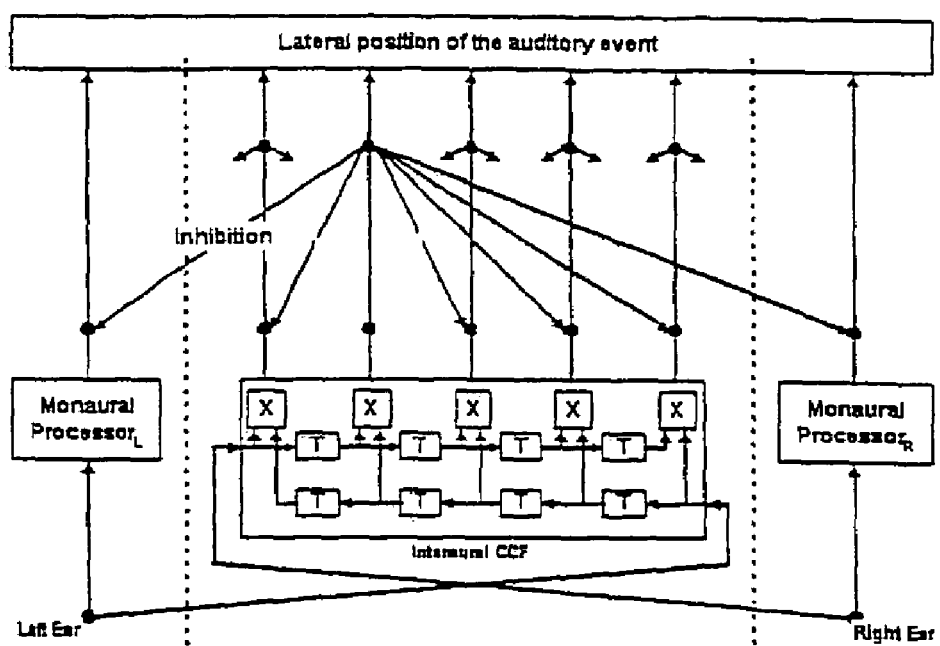
FIG. 5 shows a cross-correlation function inhibition structure used for determining the ITDs and ILDs.

In FIG. 4, the different blocks for simulating a human ear are shown in more detail. The sound signal emitted from a sound source and detected by a human being can be simulated by the following signal path. First, the outer ear has to be simulated as sound signal is first received by the outer ear. The outer ears (pinnae) are asymmetrical (as to left and right ear) and can be described by head-related transfer functions (HRTF) 41 of the right and of the left ear. For simulating a complete signal path, each HRTF function has to be considered. In the present case, however, these outer ear processing step can be omitted as a dummy head with detailed replication of the human outer ear was used and the microphones were positioned in the inner ear. This means, that the filtering by the outer ears may already be encoded in the measured head-related ear input signals. The signal is then processed by simulating the inner ear (cochlea and hair cells), which in the flowchart shown in FIG. 4 corresponds to the blocks 42, 43, and 44. To simulate the frequency decomposition as performed by the cochlea, the left and the right ear signals are processed by a gammatone-filter bank 42. By way of example, 36 bands with a sample rate of 48 kHz, covering a frequency range from 23 to 21164 Hz (mid frequencies of the filters) can be used. To mimic the firing behavior of the inner-hair-cell response, a simple half-wave rectification 43 may be implemented. To consider that the fine structure of the rectified signals cannot be resolved in the higher frequency bands, the signals are low-pass filtered after the half-wave rectification in a low pass filter 44 ($1^{st}$-order low pass, $f_{c}=1$ kHz). Afterwards, a running cross-correlation analysis comparing the signal of the left and the right channel may be carried out in each frequency band in step 45. The determination of the ILD and the ITD are described in more detail in reference to FIG. 5. To consider the sluggishness of the human binaural system, the temporal window in the running cross-correlation analysis was set to a duration of 10 ms (triangular window). The outputs of each frequency band are transformed or remapped from an ITD-scale to a scale representing the position on a left-right deviation scale (box 47). This scale represents one of the three coordinates of the binaural activity pattern to be rendered. For this scale transformation, the frequency-dependent relationship of ITDs (and ILDs) and the sideway deviation may be determined from a catalog of head-related transfer functions HRTFs that was established using the same dummy head which was used to measure the binaural room impulse responses. The catalogue has a resolution of 5° azimuth in the horizontal plane and 10° elevation in the median plane, so that altogether 1163 directions were measured.

Multiple cross-correlation peaks as caused by the periodicity of the signal, which are typically found at the contralateral side, may be eliminated by implementing contralateral inhibition into the cross-correlation algorithm. The interaural level differences are processed separately using excitation-inhibition cells. Here too, the outputs are transformed to an appropriate left-right-deviation scale.

Finally, the binaural activity pattern consists of the weighted output of the cross-correlation algorithm and the algorithm based on excitation-inhibition cells. This output may be computed and displayed for the frequency band under consideration, thus leading to the three-dimensional pattern as shown in FIG. 4. The three-dimensional binaural activity pattern is shown in a three-dimensional scale in the box with reference numeral 47. The remapping is indicated in box 46. The graph on the bottom analyzes the intensity over a lateralization, i.e., the lateral deviation relative to the axis 22 shown in FIG. 2. From the graph at the bottom, it can be deduced that the lateral deviation is approximately 45°, so that the sound source is positioned 45° relative to the middle axis. The graph on the left side shows the intensity over time. From this graph, the time delay of the sound signal can be deduced. As can be seen from the peak in the left hand graph the first direct sound arrives approximately after 20 ms, so that the distance between the sound source and the listening position can be determined when the sound propagation velocity is known. From the graph on the left hand side, the sound level can also be determined from the peak intensity.

In conclusion, the above-mentioned physiological model of the ear and the corresponding signal processing can be used to determine the three parameters needed for the exact determination of the position of the sound sources, the parameters being the sound level, the lateral deviation and the time delay. With the use of a dummy head, two microphones and a normal personal computer, the positions of the sound sources relative to each other can be determined. If the determined positions do not correspond to the positions as prescribed by the standard configuration the sound sources can be repositioned and the method can be repeated. As will be described later on, these three parameters can also be used for manipulating the different channels of the sound system in such a way that the emitted sound will be detected at the listening position as if the sound sources were positioned at positions according to the standard.

In the following, the generation of the binaural activity patterns are described in more detail.

The binaural model algorithm is signal driven, i.e., it has a strict bottom-up architecture. Its basic version had been developed by Lindemann (see Lindemann, W. (1982): Evaluation of interaural signal differences, in: O. S. Pedersen und T. Pausen (Hrsg.), Binaural effects in normal and impaired hearing, $10^{th}$ Danavox Symposium, Scandinavian Audiology Suppl. 15, 147-155), which is incorporate in this application by reference. This algorithm was originally prompted by an attempt to simulate human auditory localization including the precedence effect. The algorithm is based on the well-known physiologically-motivated algorithm to estimate interaural time differences (ITDs), as originally proposed by Jeffress in Jeffres, L. A.: A place theory of sound localization, J. Comparative and Physiological Psychology, Vol. 41, 35-39, 1948, which is incorporated into this application by reference. The Jeffress model consists of two delay lines, one from the left to the right ear, and the other one vice versa. Both are connected by several coincidence detectors, driving a central processor. A signal arriving at the left wear L(m), where m is the index for the time, has to pass a first delay unit l(m,n), where n is the index for the coincidence detectors at different internal delays, to go from left to right along the delay line. In the same way, a signal arriving at the right ear R(m) travels on the other delay line r(m,n) into the opposite direction. The discrete implementation of the delay lines can be revealed mathematically as follows—with N being the number of the implemented coincidence cells.

$$l(m+1,n+1)=l(m,n); \ 1 \leq n < N_N l(m,l)=L(m), \qquad (1)$$

$$r(m+1,n-1)=r(m,n); \ 1 < n \leq N_N r(m,N)=R(m), \qquad (2)$$

A coincidence detector c(m,n) is activated when it receives simultaneous inputs from both delay lines, namely at the positions that it is connected to. Each of the coincidence detectors is adjusted to a different ITD, due to the limited velocity of propagation of the signals on the delay lines. For example, a sound source located in the left hemisphere will arrive at the left ear first. Such, the signal can travel a longer distance on the delay line than the signal on the delay line for the right ear—before both of them activate the coincidence detector for the corresponding ITD.

The probability for two spikes from the two opposite channels to coincide at a specific cell, tuned to a specific delay, is given by the product of the number of spikes in the left and right channels that pass one of these delay cells. This product also appears in the cross-correlation function, which is defined for a discrete system as follows:

$$\Psi_{L,R}(m, n) = \frac{1}{\Delta m} \sum_{m'=m}^{m+\Delta m} c(m', n) \qquad (3)$$

with $c(m',n)=l(m',n)r(m',n)$ and the assumption that the amplitude in the left and right channel is proportional to the number of spikes. It should be noted, that in this example a rectangular window duration Am is used within which the cross-correlation function for each time interval is calculated.

Lindemann introduced contra-lateral inhibition elements to enhance this algorithm to sharpen the peaks in the binaural activity pattern and to suppress side-lobs that occur because of the periodic nature of the cross-correlation algorithm for band-pass signals. As a result, positions other than those where the coincidence occurred are suppressed. Any activity running down at one of the two tapped delay lines can inhibit the activity at the corresponding positions on the opposite delay line. The implementation of the inhibition elements is achieved by modifying the computation of the delay lines (see equations 1-2):

$$l(m,n+1)=l(m,n)[1-c_s \cdot l(m,n)] \qquad (4)$$

$$r(m,n-1)=r(m,n)[1-c_s \cdot l(m,n)] \qquad (4)$$

with static inhibition constant $0 \leq c_s < 1$.

A second objective of introducing (static) contra-lateral inhibition was to combine the influences of the ITDs and the interaural level differences (ILDs). The latter are of particular importance in the frequency range above 1.5 kHz. Thus, the results of the cross-correlation algorithm become dependent on the ILDs.

As the displacement due to ILD appeared to be too small, Lindemann introduce additional monaural processors into his model. For large ILDs not just the simple cross-correlation product $c(m,n)=l(m,n)r(m,n)$ is estimated, but rather the following equation:

$$c(n,m)=[(1-w(n)) \cdot l(n,m)+(1-w(n)) \cdot r(n,m)] \qquad (6)$$

with $w(n)=0.035 \cdot e^{-n/6}$, the monaural weighting function. For a general overview of the cross-correlation and inhibition structure see FIG. 5. Note, that monaural activity can be inhibited by binaural one, but not vice versa.

By using the cross-correlation algorithm, not only the lateral position of the cross-correlation peak, but also its width can be exploited to gain information on the auditory spaciousness of the room. There is a tendency that spaciousness increases with increasing decorrelation of the ear-input signals. This means that the broader the peaks in the correlation function are, the more spaciousness can be expected.

Gaik (Gaik, W. (1993): Combined evaluation of interaural time and intensity differences: Psychoacoustic results and computer modeling, J. Acoust. Soc. Am., Vol. 94, 98-110), which is incorporated into this application by reference, introduced an enhancement to simulate the localization in the horizontal plane in a more exact way. He extended the Lindemann model to optimally process the natural combinations of ITDs and ILDs, as they are found in head-related transfer functions. For this purpose, Gaik introduced weighting factors into the delay line in such a way, that the ILD of the signal is compensated for before the two binaural signals meet at the corresponding coincidence detector. The "corresponding" detector in each frequency band is that one which represents the specific interaural delay which comes together with a specific ILD in a given HRTF. To be able to thus compensate the ILDs for various directions, proper weighting or trading factors have to be implemented between every two coincidence detectors. This is performed with a supervised learning procedure. Without Gaik's modification, the contra-lateral inhibition would bounce the cross-correlation peak sideways to unnatural positions, even with the applied ITDs and ILDs stemming from natural pairs of HRTFs. In the last processing step, the ITDs simply have to be remapped on the basis of the azimuth, to estimate the azimuth angle of the sound source.

It has to be mentioned at this point that, before the binaural cues can be analyzed adequately, the signals have to be processed by a stage that simulates the auditory periphery, namely, outer, middle and the inner ear (cochlea).

Figure 6:
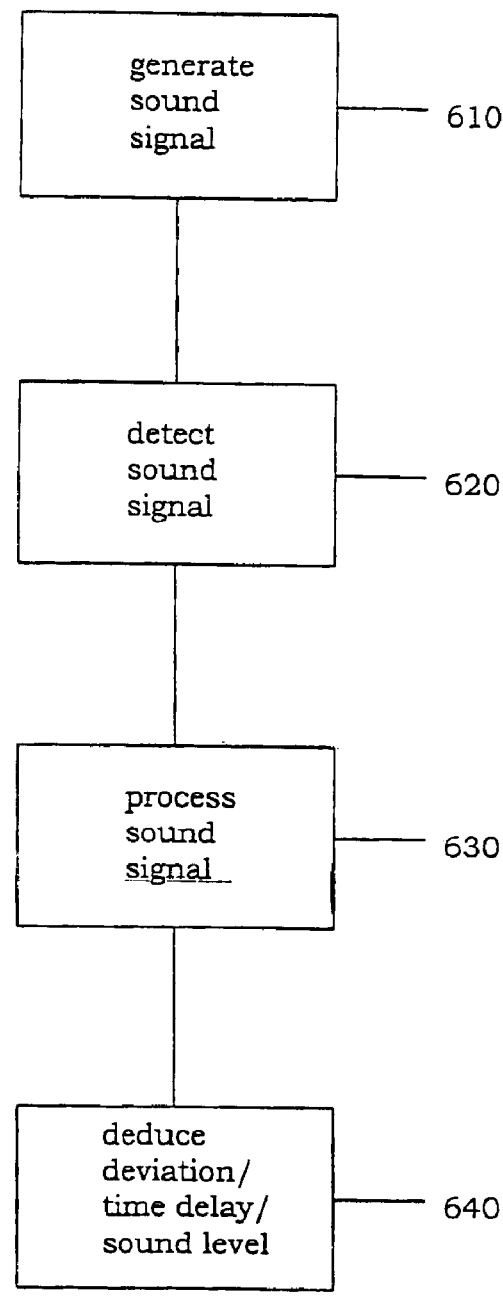
FIG. 6 shows a flowchart for determining the position related parameters of a sound source.

In FIG. 6 the different steps for determining the exact position comprising lateral deviation, time delay and sound level are shown in more detail. In a first step 610 the sound signal is generated, the signal being an impulse. The signal can be generated by the sound carte of the computer unit 14 or by any other device. This impulse is emitted from one of the loudspeakers 11 and the sound signal is detected in step 620 by the two microphones 13 in the left and the right ear of the dummy head. The sound signal is then processed in step 630 in accordance with the model shown in FIG. 4 and FIG. 5 and the deviation, time delay and/or sound level can be deduced from the binaural activity pattern in step 640.

Figure 7:
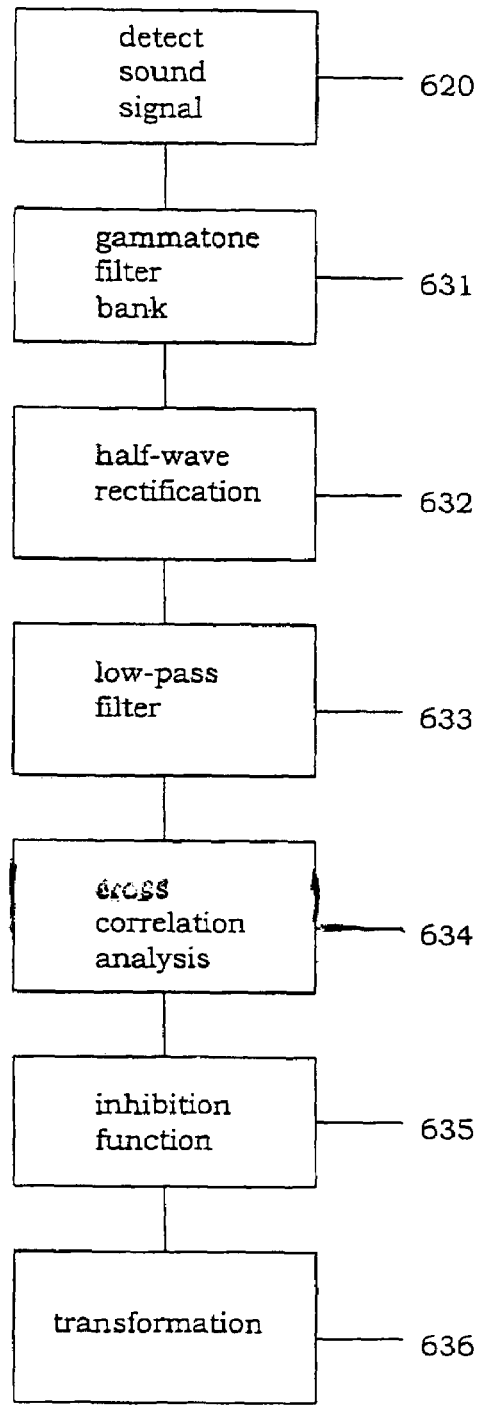
FIG. 7 shows in further detail a signal processing of the sound signal for determining the position related parameters.

In FIG. 7, the signal processing is shown in more detail. After the detection of the sound in step 620 the sound signal detected in the right and the left ear is further processed. To simulate the frequency decomposition as performed by the cochlea the left and the right ear signal are processed by a gammatone-filter bank 42 in step 631. Note, that the filtering by the outer ears is already encoded in the measured head-related impulse responses. To mimic the firing behavior of the inner hair cell response into account simple half-wave rectification is implemented in step 632. To consider that the fine structure of the rectified signals cannot be resolved in the higher frequency bands the signals are low-pass filtered after the half-wave rectification in step 633. After this, a running cross-correlation analysis comparing the signal of the left and the right channel was carried out in each frequency band (step 634). To consider the sluggishness of the human binaural system the temporal window and the running cross-correlation analysis was set to a duration of 10 ms. In step 635 the inhibition function is introduced. In the steps 634 and 635 the ITDs and the ILDs are calculated. The outputs of each frequency band are transformed from an ITD-scale to a scale representing the position on the right-left deviation scale in step 636. This scale represents one of the three coordinates of the BAP to be rendered. The time delay can be calculated from the intensity of the sound signal in dependence of time, the lateral deviation can be deduced from the intensity of the sound signal in dependence of the lateral position of the sound signal relative to the reference position, and the sound level can be deduced from the maximum of the sound signal. These three parameters determine the exact position of the sound source. In the case of a multi channel audio system these parameters could be output on a display unit of the computer unit 14, so that the user of the audio system knows whether the sound sources (loudspeakers) are positioned at the position prescribed by a standard. The user can then manually relocate the loudspeakers and run the above-described steps for determining the position again.

If the positioning of the loudspeakers at positions prescribed by the standards is not possible or is not desired, these three parameters can also be input into a manipulation unit 16. This manipulation unit 16 will manipulate the sound emitted by the sound source for compensating the mismatch of the actual position of the different sound sources relative to the reference position of each sound source. After this adjustment, the listener will have an optimal surround sound when positioned in the reference listening position, even though the loudspeakers are not positioned in the prescribed configuration.

In conclusion, it is possible to determine the position of a sound source using a simulation of the human auditory signal processing and by using the obtained binaural activity patterns. An automatic evaluation of the position is possible facilitating the setup of complex multi channel audio or audio and video systems.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A system for determining the position of a sound source, comprising:
   a sound generator for generating sound
   a sound source for emitting the generated sound,
   a sound receiving unit for detecting the generated sound emitted from the sound source, and
   a sound analyzer for processing the detected sound signal by the use of a physiological model of the ear to obtain data associated with the detected sound signal, and deducing, based on the data, at least one of lateral deviation of the sound source in relation to a reference position, time delay of the sound signal from the sound source to the reference position, and the sound level of the detected sound signal.

2. The system of claim 1, where the sound receiving unit comprises two microphones that are arranged spatially apart.

3. The system of claim 2, further comprising a dummy with two ears in which the microphones are positioned, the ears comprising replications of the external human ear.

4. The system according to claim 1, where the sound analyzer comprises a gammatone filter bank.

5. The system of claim 1, where the sound analyzer comprises a half-wave rectification unit.

6. The system of claim 1, where the sound analyzer comprises a low pass filter.

7. The system of claim 1, where the sound analyzer comprises a low pass filter.

8. The system of claim 1, further comprising a manipulation unit for manipulating the sound emitted by the sound source to compensate for a mismatch of actual position of the sound source relative to the reference position of the sound source.

9. A method for determining the position of a sound source in relation to a reference position, comprising the steps of:
   generating a sound signal emitted from the sound source,
   detecting the emitted sound signal,
   processing the sound signal by the use of a physiological model of the ear to obtain data associated with the sound signal, and
   determining, based on the data, at least one of lateral deviation of the sound source in relation to the reference position, type delay of the sound signal from the sound source to the reference position, and the sound level of the detected sound signal.

10. The method of claim 9, where the sound signal is detected by a sound receiving unit having two microphones arranged spatially apart, resulting in two audio channels which are processes by the physiological model.

11. The method of claim 10, where the two microphones are positioned in the right and left ear of a dummy with replication of the external ear.

12. The method of claim 10, where the two channel audio signal is processed by carrying out a cross correlation analysis of the sound signals of the left and right ear, said cross correlation analysis resulting in the Interaural Time Differences (ITD) of the left and right ear.

13. The method of claim 9, where the sound signal is an impulse, and the head related, binaural impulse responses are detected.

14. The method of claim 9, where the detected sound signal is processed by applying a gammatone filter bunk to the recorded signal.

15. The method of claim 9, where the sound signal is processed by a half wave rectification of the recorded sound signal.

16. The method of claim 9, where the sound signal is processed by low pass filtering the recorded sound signal.

17. The method of claim 9, further comprising determining individual positions of a plurality of sound sources of a multichannel audio system.

18. A method for determining the position of a sound source in relation to a reference position, comprising the steps of:
   generating a sound signal emitted from the sound source,
   detecting the emitted sound signal,
   processing the sound signal by the use of a physiological model of the ear, and
   determining at least one of lateral deviation of the sound source in relation to the reference position, and the sound level of the detected sound signal,
   where the sound signal is processed by introducing inhibition elements, resulting in Interaural Level Differences (ILD) of a left ear and a right ear.

19. The method of claim 18, where the signal processing comprises the step of deducing a Binaural Activity Pattern (BAP) from Interaural time differences (ITD) of the left and right ear and the Interaural Level Differences (ILD), the Binaural Activity Pattern (BAP) comprising an intensity of the sound signal in dependence of time and comprising an intensity of the sound signal in dependence of the lateral position of the sound source relative to the reference position.

20. The method of claim 19, where the time delay can be determined from the intensity of the sound signal in dependence of time, the lateral deviation can be determined from the intensity of the sound signal in dependence of the lateral position of the sound signal relative to the reference position, and the sound level can be determined from a maximum intensity of the sound signal.

21. The method of claim 20, where at least one of the lateral deviation, the time delay and the sound level can be used to calculate correction data to adjust the sound signal emitted from the sound source according to an arrangement of a plurality of sound sources corresponding to a predetermined standard arrangement of the sound source.

22. The method of claim 20, where the predetermined standard arrangement of the plurality of sound sources corresponds to an arrangement of the plurality of sound sources according to an international standard.

* * * * *

UNITED STATES PATENT AND TRADEMARK OFFICE
CERTIFICATE OF CORRECTION

PATENT NO.         : 7,386,133 B2
APPLICATION NO. : 10/962233
DATED                 : June 10, 2008
INVENTOR(S)       : Hess et al.

It is certified that error appears in the above-identified patent and that said Letters Patent is hereby corrected as shown below:

IN THE SUMMARY OF THE INVENTION:

Column 4: line 2, "corresponds" should be --correspond--; line 17, a comma should be inserted after the word "sweet-spot" and the comma removed after the word "even"; line 42, "listing" should be --listening--; line 54, "comprises" should be --comprise--; line 57, a --the-- should be inserted after the word "and"; line 58, "signal" should be --signals--; and line 59, "paths" should be --pass--.

IN THE DETAILED DESCRIPTION:

Column 5: line 63, an --a-- should be inserted after the word "as" and "it" should be --in--.

Column 6: line 1, "microphones" should be --microphone-- and "it" should be --in--; line 15, a comma should be inserted after the word "setup"; line 36, a comma inserted after the word "loudspeakers"; line 42, "differs" should be --differ--; and line 43, the comma after "way" should be removed.

Column 7: line 10, after "as", --the-- should be inserted; line 16, "step" should be --steps--; line 35, "signal" should be --signals--; and line 36, "channel" should be --channels--.

Column 8: line 27, a comma should be inserted after "configuration"; and line 42, "incorporate" should be --incorporated--.

Column 9: line 26, a comma should be inserted after "example"; line 27, "Am" should be --•m--; and line 53, "introduce" should be --introduced--.

Column 10: line 50, a comma should be inserted after "cochlea" and "signal" should be --signals--; line 54, a comma should be inserted after "account"; line 57, a comma should be inserted after "bands"; and line 62, a comma should be inserted after "system".

UNITED STATES PATENT AND TRADEMARK OFFICE
CERTIFICATE OF CORRECTION

PATENT NO. : 7,386,133 B2
APPLICATION NO. : 10/962233
DATED : June 10, 2008
INVENTOR(S) : Hess et al.

It is certified that error appears in the above-identified patent and that said Letters Patent is hereby corrected as shown below:

IN THE CLAIMS

Col. 11: Claim 1, line 43, a comma should be inserted after "sound".

Col. 12: Claim 10, line 22, "processes" should be --processed--.

Signed and Sealed this

Second Day of June, 2009

JOHN DOLL
*Acting Director of the United States Patent and Trademark Office*